United States Patent
Rau et al.

(10) Patent No.: US 12,523,345 B2
(45) Date of Patent: Jan. 13, 2026

(54) SHUT-OFF VALVE, AND HYDROGEN TANK SYSTEM COMPRISING A SHUT-OFF VALVE

(71) Applicant: Robert Bosch GmbH, Stuttgart (DE)

(72) Inventors: Andreas Rau, Stuttgart (DE); Udo Schaich, Stuttgart (DE); Joachim Soubari, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/837,952

(22) PCT Filed: Jan. 10, 2023

(86) PCT No.: PCT/EP2023/050447
§ 371 (c)(1),
(2) Date: Aug. 13, 2024

(87) PCT Pub. No.: WO2023/165747
PCT Pub. Date: Sep. 7, 2023

(65) Prior Publication Data
US 2025/0035269 A1    Jan. 30, 2025

(30) Foreign Application Priority Data
Mar. 3, 2022    (DE) ...................... 10 2022 202 170.3

(51) Int. Cl.
*F17C 13/04*    (2006.01)

(52) U.S. Cl.
CPC ...... *F17C 13/04* (2013.01); *F17C 2205/0326* (2013.01); *F17C 2205/0382* (2013.01); *F17C 2221/012* (2013.01); *F17C 2270/0184* (2013.01)

(58) Field of Classification Search
CPC .............. F17C 13/04; F17C 2205/0326; F17C 2205/0382; F17C 2221/012;
(Continued)

(56) References Cited

U.S. PATENT DOCUMENTS

| 3,312,445 A | * | 4/1967 | Trombatore | ............ F16K 31/40 251/129.21 |
| 6,675,831 B2 | * | 1/2004 | Sakaguchi | ................ F17C 1/14 137/613 |

(Continued)

FOREIGN PATENT DOCUMENTS

| DE | 102018221600 A1 | 6/2020 |
| DE | 102018221602 A1 | 6/2020 |

(Continued)

OTHER PUBLICATIONS

English Translation of JPS5150225U retrieved from espacenet.com. (Year: 2025).*

(Continued)

*Primary Examiner* — Jessica Cahill
(74) *Attorney, Agent, or Firm* — Michael Best & Friedrich LLP (57) ABSTRACT

The invention relates to a shut-off valve (1) for hydrogen tank systems. comprising
a main valve (2) having a main valve piston (3) which can be liftably moved, delimits a control chamber (6) at one end, interacts with a main valve seat (4) at the other end and is acted upon by the spring force of a spring (5) in the direction of the main valve seat (4);
a control valve (7) for controlling the lifting movements of the main valve piston (3), wherein the control valve (7) has a control valve plunger (8) which is arranged at an axial distance coaxially from the main valve piston (3) and is acted upon by the spring force of the spring (5) or a further spring (9) in the direction of a control valve seat (10); and
an annular solenoid coil (11) for actuating the control valve (7) and for acting on an end portion (12) of the main valve piston (3) designed as a solenoid plunger.

(Continued)

The invention also relates to a hydrogen tank system comprising a shut-off valve (1) according to the invention.

16 Claims, 8 Drawing Sheets

(58) Field of Classification Search
CPC ....... F17C 2270/0184; Y10T 137/7761; Y10T 137/7768; Y10T 137/7765; F16K 31/0606
See application file for complete search history.

(56) References Cited

U.S. PATENT DOCUMENTS

| | | | |
|---|---|---|---|
| 11,268,626 B2* | 3/2022 | Gruenberger | ............. F16K 1/42 |
| 11,649,906 B2* | 5/2023 | Park | .................... F16K 31/0696 251/129.15 |
| 2007/0290152 A1* | 12/2007 | Ma | ........................ F16K 31/406 251/30.01 |
| 2014/0239207 A1 | 8/2014 | Ninomiya et al. | |
| 2015/0184805 A1 | 7/2015 | Lee | |
| 2018/0038507 A1* | 2/2018 | Ninomiya | .......... F02M 21/0233 |
| 2024/0255109 A1* | 8/2024 | Rau | ..................... F16K 31/0606 |

FOREIGN PATENT DOCUMENTS

| | | | |
|---|---|---|---|
| JP | S4723918 A | | 10/1972 |
| JP | S514627 A | * | 1/1976 |
| JP | S5150225 U | * | 4/1976 |
| JP | S5444260 Y2 | * | 12/1979 |
| JP | 2009222174 A | | 10/2009 |
| JP | 2021535985 A | | 12/2021 |
| WO | 2020158728 A1 | | 8/2020 |

OTHER PUBLICATIONS

Translation of International Search Report for Application No. PCT/EP2023/050447 dated May 23, 2023 (3 pages).

* cited by examiner

SHUT-OFF VALVE, AND HYDROGEN TANK SYSTEM COMPRISING A SHUT-OFF VALVE

BACKGROUND

The invention relates to a shut-off valve for hydrogen tank systems. The invention also relates to a hydrogen tank system comprising a shut-off valve according to the invention.

Solenoid actuators comprising solenoid plungers are conventionally used for solenoid valves with large strokes, as is the case with, e.g., shut-off valves for hydrogen tank systems. Using the latter, the magnetic force decreases less with increasing distance between the armature and its fixed stop than with flat armature designs.

By way of example, DE 10 2018 221 602 A1 proceeds from a tank device for storing hydrogen comprising a valve device that can be actuated electromagnetically, which device comprises a movable valve element cooperating with a valve seat for opening and closing an outlet opening. The valve element is acted upon in the direction of the valve seat by the spring force of a spring, so the valve device is closed when the solenoid coil is not energized. In the open position, the valve element releases an outlet opening with a diameter as well as an outlet channel connected thereto. The valve element also forms a magnetic armature, which operates according to the solenoid plunger concept. When the solenoid coil is energized, a magnetic field enclosing the coil is formed, the field lines of which extend over an outer pole body, an inner pole body and the magnetic armature. The field lines in this case extend across a radial and an axial air gap between the magnetic armature and the outer pole body. With the help of the magnetic force generated in the axial air gap, the magnetic armature or the valve element can be lifted out of the sealing seat against the spring force of the spring, so that the solenoid valve opens.

In the case of a solenoid valve comprising a solenoid plunger, as described by way of example in DE 10 2018 221 602 A1, the field coupling via the radial air gap leading to a weakening of the magnetic field in the axial air gap. The result is a reduction in the magnetic force acting on the magnetic armature in the opening direction. This means that a larger solenoid coil is required, which increases the energy and installation space requirements.

The present invention attempts to remedy this situation, in particular to enable the use of a smaller solenoid coil.

Proposed in to order achieve the object of the invention is the shut-off valve according to the disclosure. In addition, a hydrogen tank system with a shut-off valve according to the invention is disclosed.

SUMMARY

The proposed shut-off valve for hydrogen tank systems comprises:
- a main valve comprising a main valve piston which can be liftably moved, which at one end delimits a control chamber, at the other end interacts with a main valve seat, and is acted upon by the spring force of a spring in the direction of the main valve seat,
- a control valve for controlling the lifting movements of the main valve piston, the control valve having a control valve plunger which is arranged at an axial distance coaxially to the main valve piston and is acted upon by the spring force of the spring or a further spring in the direction of a control valve seat, and
- an annular solenoid coil for actuating the control valve and for acting on an end portion of the main valve piston designed as a solenoid plunger.

Indirect control of the main valve with the aid of the control valve makes it possible to use a smaller solenoid coil, as this only has to provide the force required to open the control valve. Opening the control valve leads to a pressure drop in the control chamber, so that the pneumatic forces acting on the main valve piston in the closing direction decrease. The fact that the end portion of the main valve piston on the control chamber side is also designed as a solenoid plunger means that an additional magnetic force acts on the main valve piston. The combination of pneumatic force and magnetic force then causes the main valve to open.

Opening the shut-off valve therefore requires less solenoid force, so that a smaller solenoid coil can be used. As a result, energy and installation space can be saved.

According to a preferred embodiment of the invention, the control chamber can be supplied with a gas from a storage volume via an inlet throttle, or Z-throttle for short, and can be relieved via the control valve seat when the control valve is open. The control valve seat or a bore downstream of the control valve seat acts as an outlet throttle, or A-throttle for short. When the control valve is open, the gas flows from the storage volume via the Z-throttle into the control chamber and from there via the A-throttle into an outflow area. Pneumatically, the control chamber is therefore located between the storage volume and the outflow area. The pressure level in the control chamber is therefore between the accumulator pressure and the discharge pressure. After closing the control valve and the associated closing of the A throttle, pressure can be built up again in the control chamber via the inlet throttle. If the shut-off valve is used in a hydrogen tank system, the gas is preferably hydrogen. This means that the control chamber is supplied with hydrogen via the inlet throttle, preferably from a storage volume of a pressurized gas container of the hydrogen tank system, so that the control chamber is acted upon with storage pressure. High pressure then prevails in the control chamber, while a lower pressure prevails on the control side depending on the operating point, for example in the event of a volume withdrawal due to the seat throttling on the main valve. The pressure difference causes a pneumatic force which, together with the spring force of the at least one spring, ensures that the shut-off valve is closed and remains closed when the solenoid coil is de-energized. Even at operating points without volume tapping and therefore no pressure drop at the main valve seat, the main valve is held securely closed or closed by the spring force.

A guide gap can be used as an inlet throttle, which remains between the end portion of the main valve piston designed as a solenoid plunger and a guide portion on the housing side that accommodates the end portion. In this case, no further measures are required to form the inlet throttle. Alternatively or additionally, the end portion of the main valve piston designed as a solenoid plunger can have at least one longitudinal groove and/or flattening to form the inlet throttle. In this way, a larger and/or defined throttle cross-section can be made available. In a further advantageous embodiment, a sealing element is provided in the guide area, which pneumatically separates the control chamber from the accumulator pressure. In this case, the inlet throttle is implemented via an additional throttling connection between the storage volume and the control chamber, for example via a throttle bore on the housing, valve or seal side.

The control valve plunger is preferably designed as a flat plunger. To optimize the field line guidance, it is also proposed that the flat plunger maintains a circumferential distance to a housing of the shut-off valve in the radial direction. The distance causes a magnetic field to build up when the solenoid coil is energized, the field lines of which are mainly conducted through the axial working air gap, resulting in a high force acting on the control valve plunger.

The at least one spring of the shut-off valve is preferably accommodated in the control chamber, which therefore also serves as a spring chamber. In the case of only one spring, this can be supported on the main valve piston on the one hand and on the control valve plunger on the other. The provision of only one spring reduces the number of components. However, the spring force of the spring must be matched to the force required to close the main valve, so that it may be oversized for closing the control valve. This force must then be provided by the solenoid coil to open the control valve. To make the solenoid coil even smaller, it is therefore advantageous to provide a second spring that is matched to the control valve and is therefore smaller. To accommodate the two springs, the control chamber is then preferably divided by an intermediate wall with a through-flow opening, so that two spring chambers connected via the through-flow opening are formed. The intermediate wall also serves to support the two springs on the housing side.

Furthermore, it is proposed that the main valve piston has or forms an annular collar with a stop surface, in which preferably at least one radially extending flow channel is formed. Together with a stop surface on the housing side, the annular collar forms a lifting stop. In contact with the lifting stop, the at least one radial flow channel ensures that the inlet throttle remains pneumatically connected to the storage volume. The annular collar can be formed, for example, by locally thickening the main valve piston. Alternatively, the main valve piston can have a separate ring- or sleeve-shaped part that is arranged on the outer circumference of the main valve piston and is connected to it in a force-, form- and/or material-locking manner.

In one embodiment of the invention, it is proposed that the main valve piston has a portion designed as a flat plunger, in which at least one through-flow opening and/or a radially extending flow channel is or are formed. Due to its larger diameter, the portion of the main valve piston designed as a flat plunger has a larger magnetic interface than the portion designed as a solenoid plunger, which results in a higher force acting on the main valve piston. The design of the main valve piston as a plunger and flat plunger thus enables further optimization of the field line guidance, in which the field lines of the magnetic circuit are mainly guided through axial working air gaps. The main valve piston is then opened by the applied pneumatic pressure conditions and the magnetic forces acting on the two plunger portions.

It is also proposed that the solenoid coil has an increased magnetic resistance in an area that interacts with the portion of the main valve piston designed as a flat plunger. Due to the increased magnetic resistance, the field lines are guided even more strongly through the portion of the main valve piston designed as a flat plunger, which leads to an increased force on the flat plunger. In extreme cases, this area can even become saturated.

The portion of the main valve piston designed as a flat plunger can also form a stop surface which interacts with a stop surface on the housing side to form a lifting stop. In this case, the flat plunger replaces an annular collar. The at least one through-flow opening formed in the flat plunger and/or the at least one radially extending flow channel formed in the flat plunger then ensures the pneumatic connection of the inlet throttle to the storage volume.

Preferably, the control valve plunger has at least one through-flow opening to relieve the control chamber. The at least one through-flow opening ensures that the control chamber can be relieved via the open control valve when the control valve plunger is at full stroke. The at least one through-flow opening can, for example, be designed as an inclined bore, via which the control chamber remains connected to the control valve seat.

A preferred field of application of a shut-off valve according to the invention is hydrogen tank systems, so that a hydrogen tank system is also proposed which comprises at least one pressurized gas container and a shut-off valve according to the invention for shutting off the pressurized gas container. The hydrogen tank system can be used in particular in a fuel cell vehicle or in a vehicle using hydrogen combustion.

BRIEF DESCRIPTION OF THE DRAWINGS

Preferred embodiments of the invention and the advantages thereof are explained in greater detail hereinafter with reference to the accompanying drawings. Shown are:

FIGS. 1a)-e) each a schematic longitudinal section through a first shut-off valve according to the invention in different switching positions, FIGS. 2a)-e) each a schematic longitudinal section through a second shut-off valve according to the invention in different switching positions, FIGS. 3a)-e) each a schematic longitudinal section through a third shut-off valve according to the invention in different switching positions, FIGS. 4a)-e) each a schematic longitudinal section through a fourth shut-off valve according to the invention in different switching positions,

DETAILED DESCRIPTION

Figure 1:
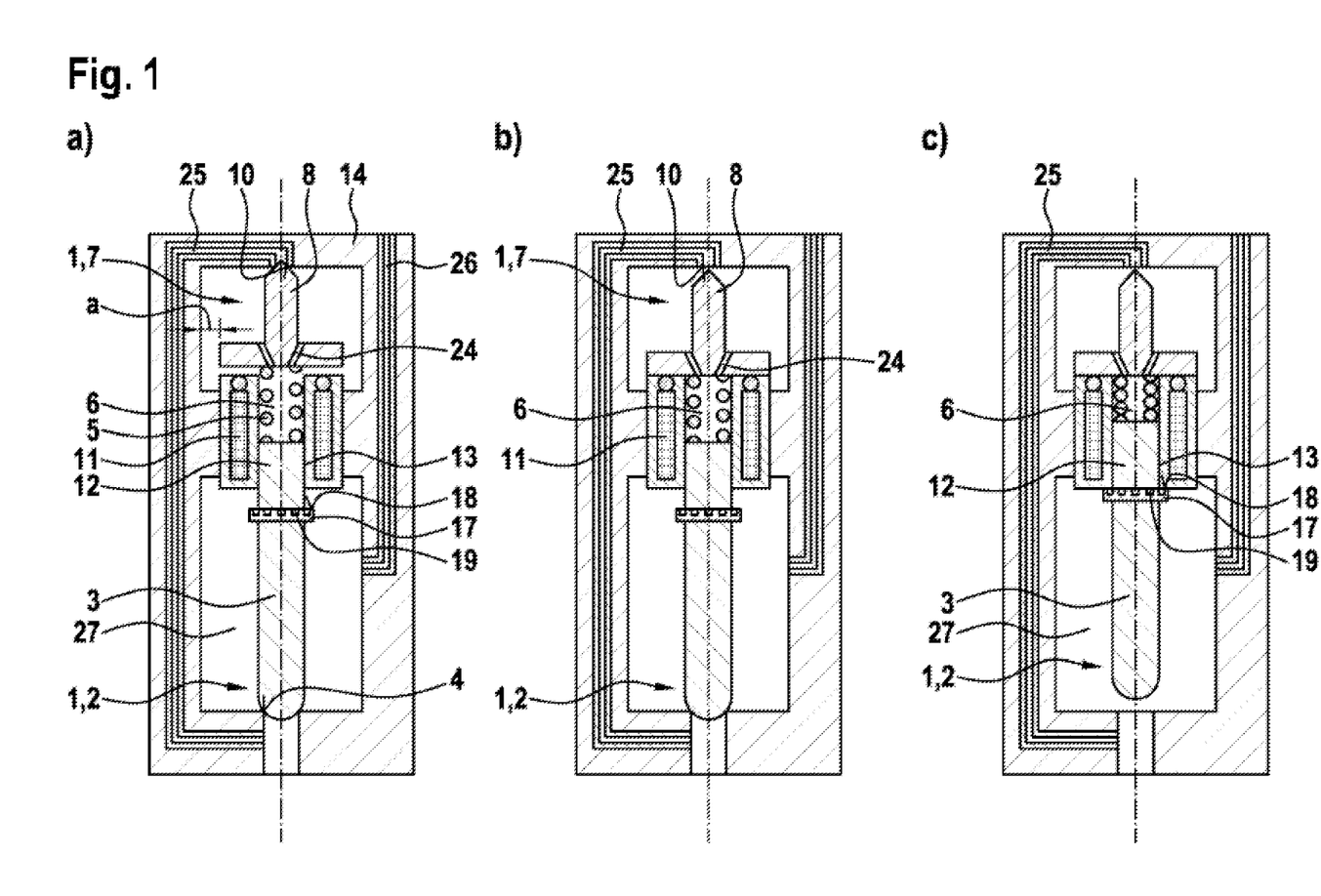

The shut-off valve 1 shown in FIGS. 1a)-e) has a main valve 2 with a main valve piston 3 which can be liftably moved, which interacts with a main valve seat 4 and is acted upon by the spring force of a spring 5 in the direction of the main valve seat 4. At its end facing away from the main valve seat 4, the main valve piston 3 delimits a control chamber 6, which is connected to gas from a storage volume of a pressurized gas container (not shown) via an inlet throttle 13. The gas flows from the storage volume of the pressurized gas container via a gas line 26 into a valve chamber 27 and from there via the inlet throttle 13 into the control chamber 6. In this case, the inlet throttle 13 is formed via the guide clearance of a guide portion on the housing side for guiding the main valve piston 3. The control chamber 6 and the valve chamber 27 are therefore under storage pressure or high pressure. On the control side, i.e. in a gas line 25, the pressure level is usually lower than the storage pressure. The applied pneumatic pressure conditions and the spring force of the spring 5 therefore press the main valve piston 3 into the main valve seat 4 so that the main valve 2 is closed.

To open the main valve 2, an annular solenoid coil 11 acts on a control valve plunger 8 of a control valve 7, which is designed as a flat plunger. Energizing the solenoid coil 11 leads to the formation of a magnetic field, the magnetic force of which lifts the control valve plunger 8 out of the control valve seat 10 so that the control valve 7 opens (see FIG. 1b)). The fact that the control valve plunger 8 is designed as a flat plunger means that a high magnetic force acts on it. The field line guidance of the magnetic circuit is further optimized by the fact that the flat plunger maintains a radial distance a to a housing 14, so that the field lines are predominantly guided through the axial working air gap.

When the control valve 7 is open, gas flows out of control chamber 6 into gas line 25, causing the pressure in control chamber 6 to drop. Through-flow openings 24 formed in the control valve plunger 8 ensure that gas can flow out of the control chamber 6 even when the control valve plunger 8 is at full stroke.

The pressure drop in the control chamber 6 relieves the main valve piston 3, while the pressure on the control side or in the gas line 25 increases. Since an end portion 12 of the main valve piston 3 on the control chamber side is designed as a solenoid plunger, the magnetic force of the solenoid coil 11 acts on it at the same time, so that a combination of pneumatic and magnetic force ultimately leads to the opening of the main valve 2 (see FIG. 1c)). An annular collar 17 formed on the main valve piston 3 with a stop surface 18 delimits the opening stroke of the main valve piston 3. At the full opening stroke of the main valve piston 3, radially extending flow channels 19 in the annular collar 17 ensure that the inlet throttle 13 remains connected to the valve chamber 27 and thus to the storage volume of the pressurized gas container.

To close the main valve 2, the energization of the solenoid coil 11 is terminated so that the spring 5 returns the control valve plunger 8 to the control valve seat 10 and closes the control valve 7 (see FIG. 1d)). As no more gas flows out of the control chamber 6, it fills with gas via the inlet throttle 13 so that the pressure in the control chamber 6 rises again. The pneumatic pressure conditions lead to a pneumatic force which, together with the spring force of the spring 5, returns the main valve piston 3 to the main valve seat 4 so that the main valve 2 closes (see FIG. 1e)).

Figure 2:
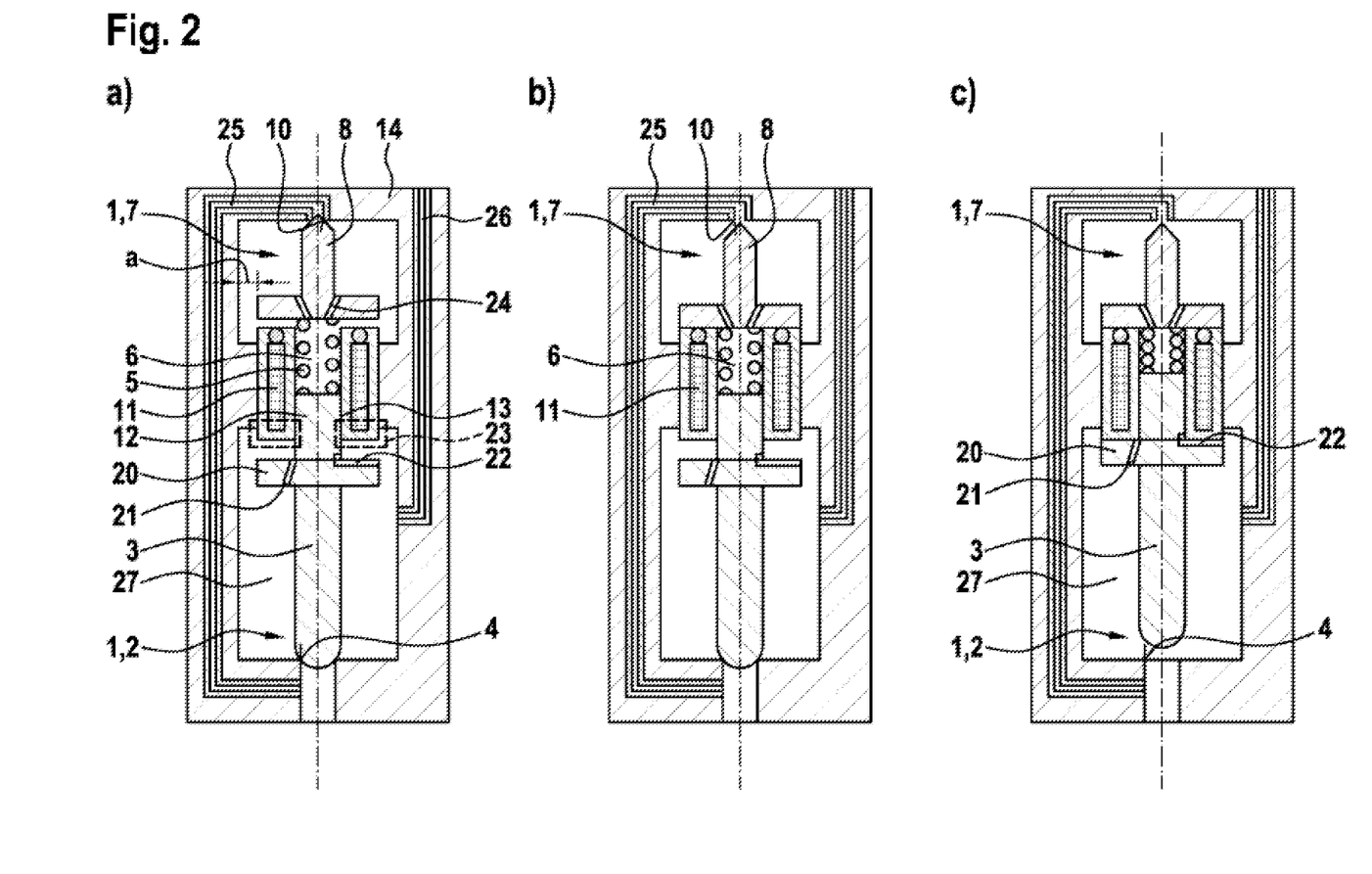

FIGS. 2a)-e) show a further preferred embodiment of a shut-off valve 1 according to the invention. This differs from that in FIGS. 1a)-e) in particular in that the main valve piston 3 not only has an end portion 12 designed as a solenoid plunger, but also a portion 20 designed as a flat plunger. In an area 23 that interacts with the flat plunger, the solenoid coil 11 also has an increased magnetic resistance so that the field lines are increasingly guided through the portion designed as a flat plunger as a result of these measures. As a result, an increased magnetic force acts on the main valve piston 3. The portion 20, which is designed as a flat plunger, also replaces the annular collar 17, so that the lifting stop is formed by the portion 20. At the full opening stroke of the main valve piston 3, the pneumatic connection of the inlet throttle 13 to the valve chamber 27 is ensured by at least one through-flow opening 21 formed in the flat plunger portion and a flow channel 22.

The mode of operation of the shut-off valve 1 in FIGS. 2a)-e) corresponds to that of the shut-off valve 1 in FIGS. 1a)-e). FIG. 2a) shows the shut-off valve 1 with the solenoid coil 11 de-energized, i.e. in the closed state. To open, the solenoid coil 11 is energized so that a magnetic field builds up, the magnetic force of which lifts the control valve plunger 8 of the control valve 7 out of the control valve seat 10 (see FIG. 2b)). When the control valve 7 is open, gas flows out of control chamber 6 into gas line 25, causing the pressure in control chamber 6 to drop. The pressure drop in the control chamber 6 relieves the main valve piston 3 so that the forces acting on the main valve piston 3 in the opening direction predominate and the main valve 2 opens (see FIG. 2c)). To close, the solenoid coil 11 is de-energized so that the spring 5 returns the control valve plunger 8 to the control valve seat 10 (see FIG. 2d)). When control valve 7 is closed, the pressure in control chamber 6 rises again, as this is pneumatically connected to valve chamber 27 via inlet throttle 13. In the same way, the pressure in the pressure chamber 6 also increases, so that the forces acting on the main valve piston 3 in the closing direction predominate and the main valve piston 3 is returned to the main valve seat 4 (see FIG. 2e)).

Figure 3:
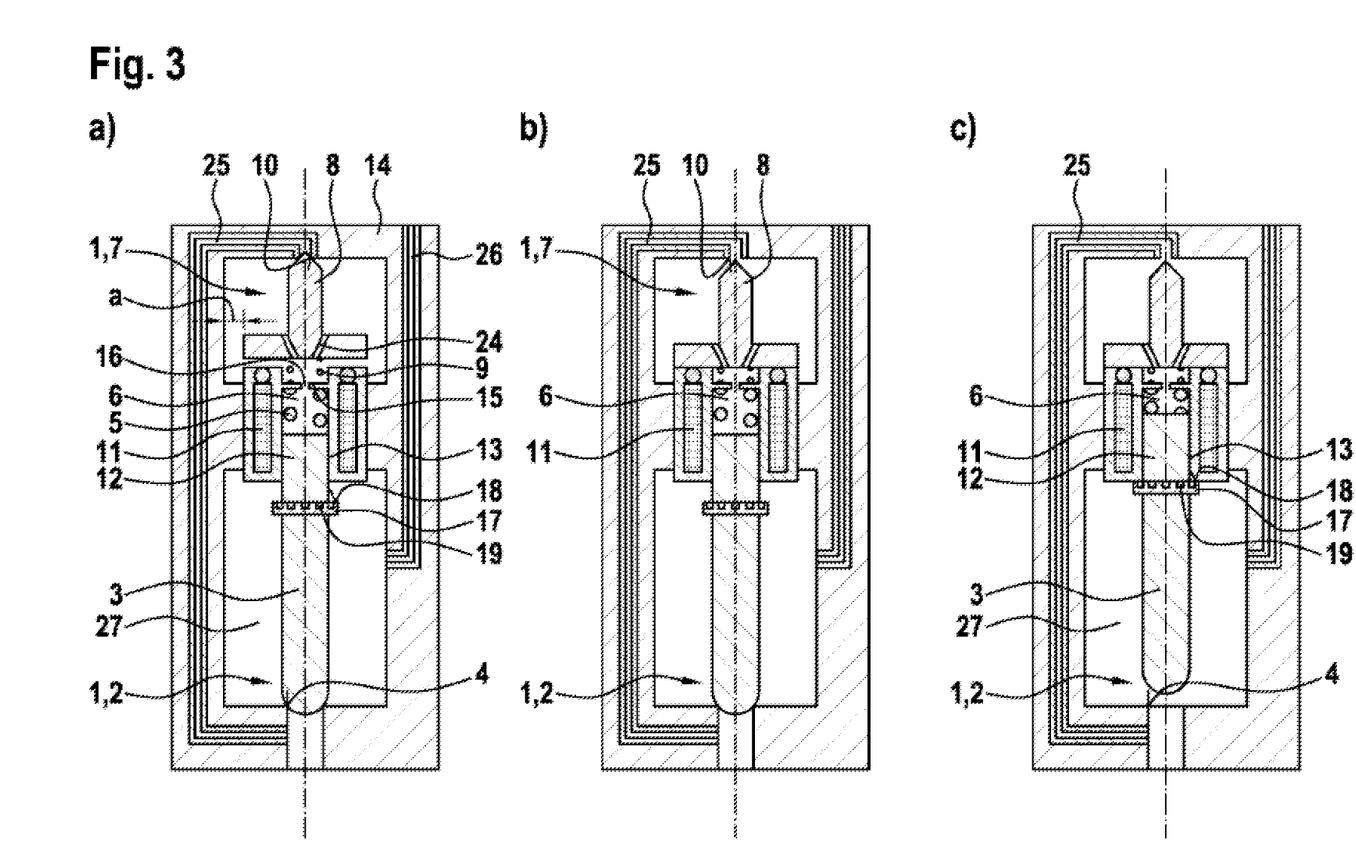

The shut-off valve 1 according to the invention shown in FIGS. 3a)-e) is an embodiment of the shut-off valve 1 in FIGS. 1a)-e). Instead of a common spring 5, two springs 5, 9 are accommodated in the control chamber 6. The control chamber 6 is divided into two spring chambers by an intermediate wall 15 with a central through-flow opening 16, so that both springs 5, 9 can be supported on the intermediate wall 15. The other spring 9 can be designed to be smaller than spring 5, as it only has to close the control valve 7. The solenoid force required to open the control valve 7 is reduced accordingly, so that a smaller solenoid coil 11 can be used. The mode of operation of the shut-off valve 1 in FIGS. 3a)-e) corresponds to that of the shut-off valve 1 in FIGS. 1a)-e), so reference is made to the corresponding description in order to avoid repetition.

Figure 4:
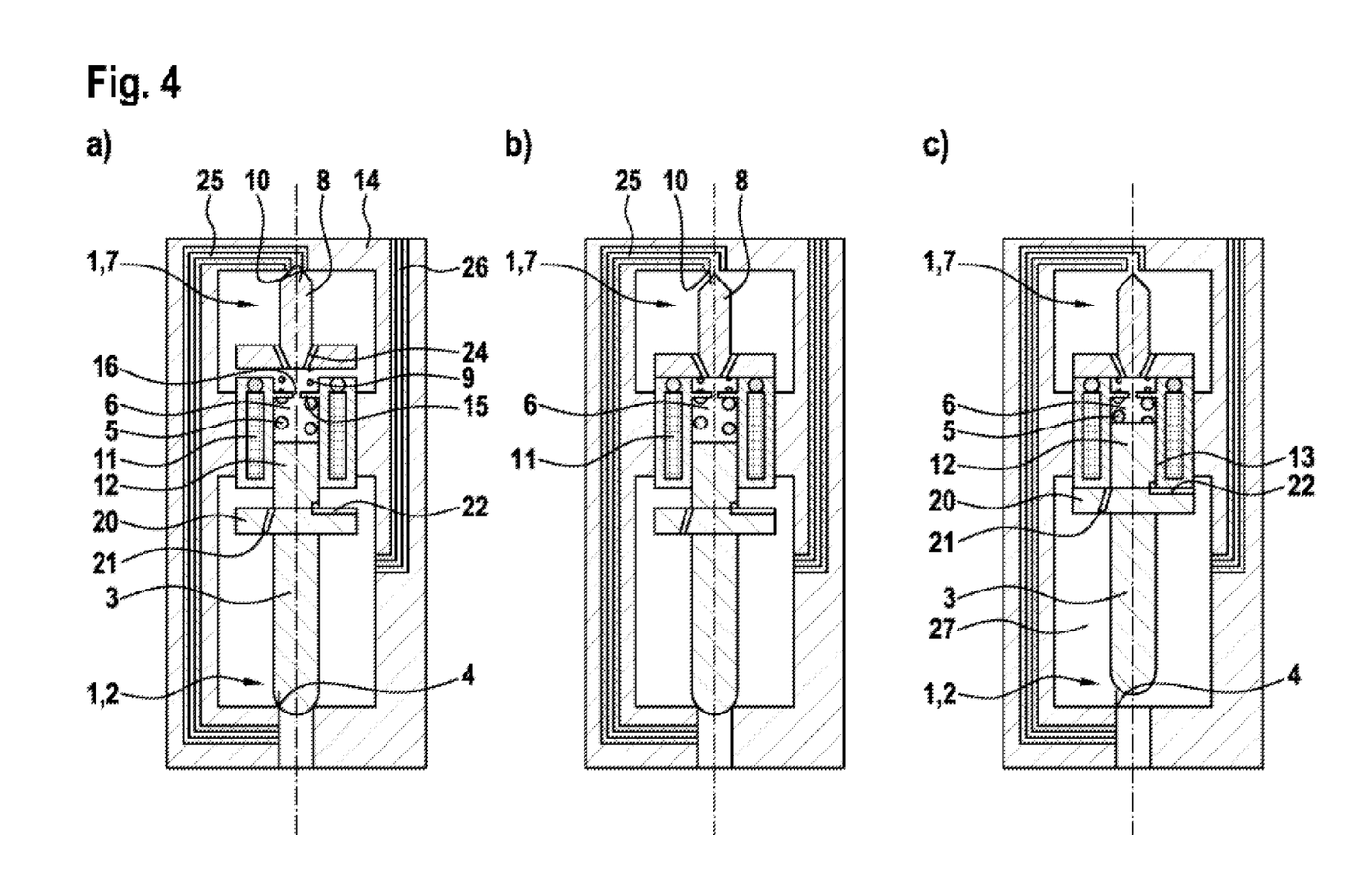

The shut-off valve 1 according to the invention shown in FIGS. 4a)-e) is an embodiment of the shut-off valve 1 in FIGS. 2a)-e). Instead of a common spring 5, two springs 5, 9 are also accommodated in the control chamber 6. The control chamber 6 is divided into two spring chambers by an intermediate wall 15 with a central through-flow opening 16, so that both springs 5, 9 can be supported on the intermediate wall 15. The other spring 9 can be designed to be smaller than spring 5, as it only has to close the control valve 7. The solenoid force required to open the control valve 7 is reduced accordingly, so that a smaller solenoid coil 11 can be used. Since the mode of operation of the shut-off valve 1 in FIGS. 4a)-e) is otherwise the same as that of the shut-off valve 1 in FIGS. 2a)-e), reference is made to the corresponding description in order to avoid repetition.

The invention claimed is:

1. A shut-off valve (1) for hydrogen tank systems, comprising a main valve (2) having a main valve piston (3) which can be liftably moved, delimits a control chamber (6) at one end, interacts with a main valve seat (4) at another end, and is acted upon by a spring force of a spring (5) in a direction of the main valve seat (4); a control valve (7) for controlling lifting movements of the main valve piston (3), wherein the control valve (7) has a control valve plunger (8) which is arranged at an axial distance coaxially from the main valve piston (3) and is acted upon by the spring force of the spring (5) or a further spring (9) in a direction of a control valve seat (10); and an annular solenoid coil (11) for actuating the control valve (7) and for acting on an end portion (12) of the main valve piston (3) configured as a solenoid plunger;

wherein the control valve plunger (8) has at least one through-flow opening (24) for relieving the control chamber (6).

2. The shut-off valve (1) according to claim 1, wherein movements of the main valve piston (3) and the control valve plunger (8) are in opposite directions.

3. The shut-off valve (1) according to claim 2, wherein the control chamber (6) can be supplied with a gas from a storage volume via an inlet throttle (13) and can be relieved via the control valve seat (10) when the control valve (7) is open.

4. The shut-off valve (1) according to claim 3, wherein the end portion (12) of the main valve piston (3), which is configured as the solenoid plunger, has at least one longitudinal groove and/or flattening for forming the inlet throttle (13).

5. The shut-off valve (1) according to claim 1, wherein the control chamber (6) can be supplied with a gas from a storage volume via an inlet throttle (13) and can be relieved via the control valve seat (10) when the control valve (7) is open.

6. The shut-off valve (1) according to claim 5, wherein the end portion (12) of the main valve piston (3), which is configured as a solenoid plunger, has at least one longitudinal groove and/or flattening for forming the inlet throttle (13).

7. The shut-off valve (1) according to claim 5, wherein the gas is hydrogen.

8. The shut-off valve (1) according to claim 1, wherein the control valve plunger (8) is configured as a flat plunger.

9. The shut-off valve (1) according to claim 8, wherein the flat plunger maintains a circumferential distance (a) from a housing (14) in a radial direction.

10. The shut-off valve (1) according to claim 1, wherein the spring (5, 9) is accommodated in the control chamber (6).

11. The shut-off valve (1) according to claim 10, wherein the control chamber (6) is divided by an intermediate wall (15) comprising a through-flow opening (16).

12. The shut-off valve (1) according to claim 1, wherein the main valve piston (3) comprises or forms an annular collar (17) having a stop surface (18).

13. The shut-off valve (1) according to claim 12, wherein at least one radially extending flow channel (19) is formed in the stop surface (18).

14. The shut-off valve (1) according to claim 1, wherein the main valve piston (3) comprises a portion (20) configured as a flat plunger, in which at least one through-flow opening (21) and/or a radially extending flow channel (22) is or are formed.

15. The shut-off valve (1) according to claim 14, wherein the solenoid coil (11) has an increased magnetic resistance in a region (23) that interacts with the portion (20) of the main valve piston (3) configured as a flat plunger-armature.

16. A hydrogen tank system comprising at least one pressurized gas container and a shut-off valve (1) according to claim 1 for shutting off the pressurized gas container.

* * * * *